Sept. 10, 1957        J. GIUFFRIDA        2,806,208
VACUUM TUBE VOLTMETER
Filed Sept. 29, 1951
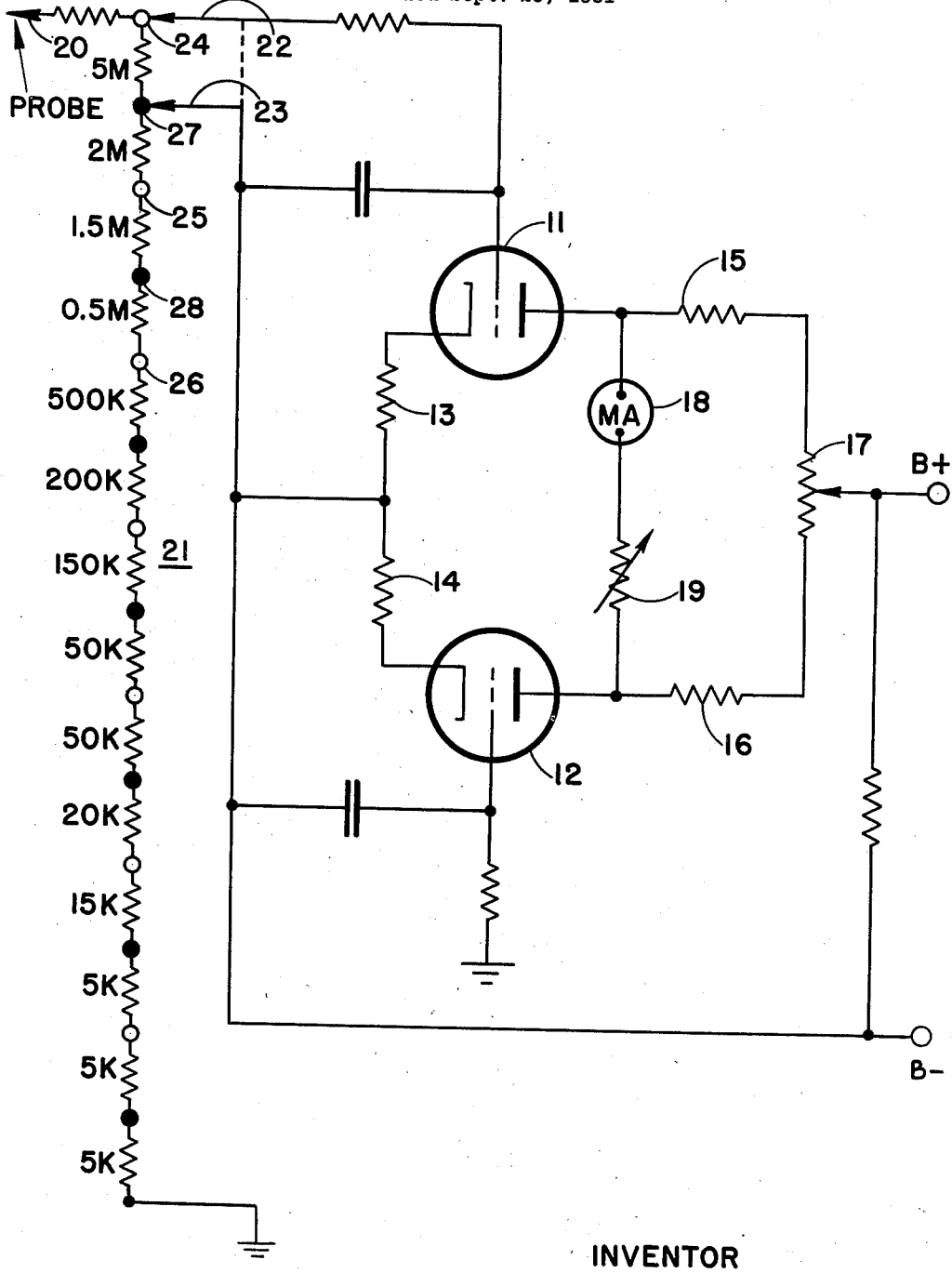
INVENTOR
Joseph Giuffrida
BY *George W. Crowley*
ATTORNEY

United States Patent Office 2,806,208
Patented Sept. 10, 1957

2,806,208

VACUUM TUBE VOLTMETER

Joseph Giuffrida, Lawrence, Mass., assignor to Columbia Broadcasting System, Inc., a corporation of New York, doing business under the name of Hytron Radio & Electronics Co., a Division of Columbia Broadcasting System, Inc., Salem, Mass.

Application September 29, 1951, Serial No. 249,000

8 Claims. (Cl. 324—123)

This invention relates in general to measuring instruments and in particular to vacuum tube voltmeters.

Vacuum tube voltmeters are used in numerous applications throughout the electronic art and are satisfactory for most purposes. However, in those instances where extremely high sensitivity is required, as when measurements must be made in the range of a few millivolts, vacuum tube voltmeters are generally insufficiently sensitive to be used. Many of the conventional circuits incorporate a vacuum tube in each of two of the arms of a bridge and the voltage differential across the bridge caused by unbalance is the basis of the measure of input voltage to the meter. To achieve high sensitivity with a bridge-type circuit it is necessary that the plate current in the tubes be correspondingly high. Such high plate currents or space currents are often accompanied by objectionable grid currents caused by ionization of residual gas being ionized by the space currents or by grid emission when the grid is heated by radiation from the plate. These currents give rise to instability and lack of linearity in the circuit. Because of these disadvantages, the potential sensitivity of the vacuum tube voltmeter is not realized in practice.

Therefore it is an object of the present invention to provide a vacuum tube voltmeter having a bridge-type circuit wherein objectionable grid currents in the vacuum tubes are rendered ineffective.

It is a further object of the present invention to provide a vacuum tube voltmeter having high sensitivity without loss of stability and linearity.

In general, the present invention consists in a circuit of the bridge-type for a vacuum tube voltmeter which includes components designed to cause relatively high plate current to flow through the vacuum tubes which comprise two of the arms of the bridge. In order to avoid loss of stability and linearity in the meter due to high grid currents, the grid currents are balanced out by maintaining the resistance between each grid and the common cathode return at equal values at all ranges of the meter. For a better understanding of the invention together with other and further objects, features and advantages reference should be made to the following description which is to be read in connection with the accompanying drawing, the single figure of which is a circuit diagram of the basic bridge circuit of an embodiment of the vacuum tube voltmeter of the invention.

The fundamental bridge includes triodes 11 and 12 which form, with their cathode resistors 13 and 14 two adjacent arms of the bridge. The other two arms of the bridge are formed by resistors 15 and 16 plus portions of balancing potentiometer 17 as determined by the setting of the movable contact thereof. The movable contact of potentiometer 17 connects directly to a source of anode voltage which is conventional in all respects, but which is designed to have high leakage resistance from both legs thereof to ground. Bridge unbalance is read on meter 18 which has a suitable calibrating rheostat 19 in series therewith. The grid of triode 12 is grounded through a suitable resistor and the voltage to be measured is applied to the grid of triode 11. The voltage to be measured is picked up by probe 20 and is actually applied across voltage divider 21 providing a very high impedance to the circuit under observation. Divider 21 is composed of a number of series connected resistors any number of which may be switched into the voltmeter circuit by moving tap 22 into contact with a suitable point on the switch. In the drawing a representative number of resistors are shown in the chain to provide voltage scales from 0.5 volt to 500 volts, but these values are only for purposes of illustration; any desired scales could be provided by the insertion of resistors of suitable value and by making other minor changes.

Tap 23, which is mechanically connected to tap 22 and movable therewith, serves the purpose of presenting equal impedances to each of the grids of tubes 11 and 12 despite the voltage range in which the voltmeter is operating. In normal practice, tap 22 would be the only tap on divider 21 and would move from point 24 to point 25 thence to point 26 and so on down the divider chain as voltage ranges are changed. In this invention, however, each of the range determining resistors is voltage tapped in the manner shown, tap 23 contacting point 27 when tap 22 is in contact with point 24. Thus, in the 0.5 volt range, the grid current in triode 11 passes through the 5 megohms of the divider between points 24 and 27, since that 5 megohms is in the grid-cathode return. The grid current in triode 12 also passes through 5 megohms of resistance in the divider since it passes through the series array in the divider from point 27 to ground, these resistors of the array having a total value of 5 megohms. A similar situation exists no matter which of the ranges is being used; the resistance in each grid circuit remains the same as that in the other.

Physically, the divider-center tap structure is simply obtained by the use of an additional section on the conventional range switch. In the usual manner, the first switch wafer sets range by connecting the grid of triode 11 to the appropriate resistor. The voltage tap on each range setting resistor is connected in circuit with the common cathode lead through a second switch wafer. Considering the resistance between points 24 and 25 to be the first range determining resistor, the voltage tap would be at point 27 and the desired condition of the common cathode being equal in resistance from each of the grids is met.

Relatively low value cathode resistors are used to insure plate current through the vacuum tubes which is relatively high for vacuum tube voltmeters with correspondingly high sensitivity. Because the grid currents which are often incidental to such plate current operation are balanced out in the manner indicated above, no loss of stability or linearity ensues.

Although there has been shown only the direct current bridge portion of the vacuum voltmeter, it is obvious that peak-to-peak or R. M. S. reading diodes for alternating current scales and an additional divider for ohmmeter scales could be added to the circuit to provide a more versatile instrument.

Although the invention has been illustrated and described in connection with one practical vacuum tube voltmeter circuit in which it has been incorporated, it is believed that the concept of equalizing grid resistance to increase sensitivity without sacrifice of stability and linearity in a vacuum tube voltmeter have application in other devices employing paired vacuum tubes in which high grid currents are objectionable. For these reasons, the invention should only be limited by the scope of the appended claims.

What is claimed is:

1. A vacuum tube voltmeter comprising a high impedance range determining voltage divider, means for applying voltages to be measured across said divider, said divider being returned to a first voltage reference point and including a plurality of serially connected resistors each having a fixed voltage tap, a bridge having four resistance arms, a vacuum tube having its cathode and anode connected serially in circuit with each of two of said arms, said vacuum tubes each having at least an anode, a grid and a cathode, the grid of one of said vacuum tubes being returned to said fixed voltage reference point, said cathodes being connected together and returned to a second voltage reference point, a source of voltage also returned to said second voltage reference point for said anodes, switching means for connecting the grid of the other of said vacuum tubes to any one of said plurality of resistors of said voltage divider and for simultaneously connecting said cathodes to the voltage tap of the resistor to which the grid of said one of said vacuum tubes is connected, and means for indicating the difference in potential between said anodes of said vacuum tubes.

2. A voltage divider for a vacuum tube voltmeter of the bridge-type having a vacuum tube having its cathode and anode serially connected in each of two of the arms thereof comprising, a plurality of resistors connected in series to a first voltage reference point, means for applying an unknown voltage across said plurality of resistors, voltage taps on each of said resistors, a source of voltage for said anodes returned to a second voltage reference point, switching means for connecting the grid of one of said vacuum tubes to any one of said resistors and for simultaneously connecting the cathodes of said vacuum tubes to the voltage tap of the said one of said resistors to which the grid of the said one of said vacuum tubes is connected, said cathodes being at all times returned to said second voltage reference point, and means connecting the grid of the other of said vacuum tubes to said first voltage reference point, the resistance values of said plurality of resistors being such that equal resistance is maintained between each of said grids and said cathodes in all positions of said switching means.

3. A vacuum tube voltmeter comprising, a high impedance voltage divider for receiving voltages to be measured, said divider including a plurality of serially connected resistors, the values of said resistors being such that the resistance value of any single resistor other than the grounded resistor is equal to the total resistance value of the resistors between said single resistor and ground, a bridge circuit having four resistance arms, a vacuum tube having at least a cathode, a grid and an anode, said cathode and anode being serially connected in each of two of said arms, said cathodes being connected together, equal value resistors forming the remaning two of said arms, a multiple position switch for placing single resistors of said divider serially in circuit between said cathodes and the grid of one of said vacuum tubes, the grid of the other of said vacuum tubes being grounded through a resistance, means for initially balancing said bridge, means for supplying anode voltage to said vacuum tubes, and means for indicating unbalance of said bridge caused by changes in current flow through said bridge.

4. A vacuum tube voltmeter comprising, an input probe introducing an unknown voltage to said voltmeter, a voltage divider for determining voltage range having one end grounded and the other end connected to said probe, said divider including a plurality of serially connected resistors, the values of said resistors being such that the resistance value of any single resistor other than the grounded resistor is equal to the total resistance value of the resistors between said single resistor and ground, a bridge circuit having four resistance arms, a vacuum tube having at least a cathode, a grid and an anode, said cathode and anode being serially connected in each of two of said arms, equal value resistors forming the remaining two of said arms, the cathodes of said vacuum tubes being connected together, a multiple position switch for placing single resistors of said divider serially in circuit between said cathodes and the grid of one said vacuum tubes, the grid of the other of said vacuum tubes being grounded through a resistance, a source of anode voltage for said vacuum tubes, a potentiometer having the movable contact thereof connected to said source of anode voltage, each of the fixed ends of said potentiometer being connected to the anode of one of said vacuum tubes through one of said equal value resistance arms of said bridge, a meter and a variable calibrating resistor connected between the anodes of said vacuum tubes for indicating unbalance of said bridge, the resistance between the grid of one of said tubes and said cathodes being maintained equal to the resistance between the grid of the other of said tubes and said cathodes in all positions of said switch.

5. In a bridge type vacuum tube voltmeter having vacuum tubes in two of the adjacent arms thereof, an input circuit comprising, a voltage divider including a plurality of series connected resistors, means for applying an unknown voltage across said divider, and switching means for selectively placing various equal portions of the resistance in said divider between the grids and cathodes of said two vacuum tubes.

6. In a bridge type vacuum tube voltmeter having vacuum tubes in two of the adjacent arms thereof, an input circuit comprising, a voltage divider including a plurality of series connected resistors, each of said resistors having a tap thereon, switching means having two movable contacts for simultaneously contacting the end of any one of said resistors remote from ground and its tap, the values of said resistors and the positions of said taps being predetermined such that the resistance value from any resistor end remote from ground to its tap is equal to the value from that tap to ground, and means connecting each of said switching means contacts separately to the grid-cathode circuit of one of said tubes and to the grid-cathode circuit of the other of said tubes, whereby resistance between grid and cathode of each of said vacuum tubes is maintained equal in all positions of said switching means.

7. An input circuit for a bridge type vacuum tube voltmeter for maintaining equal resistance between grid and cathode of each of two vacuum tubes in adjacent arms of said bridge comprising, a voltage divider for receiving an unknown input signal, and switching means for placing equal portions of the resistance of said divider between the grid and cathode of each of said vacuum tubes in a plurality of range determining positions.

8. A vacuum tube voltmeter comprising, a high impedance voltage divider, a probe for impressing an unknown voltage across said voltage divider, said divider including a plurality of series connected resistors of values such that the resistance value of any single resistor other than the grounded resistor is equal to the total resistance value of the resistors between said single resistor and ground, a bridge circuit having four resistance arms, a triode vacuum tube connected in each of two of said resistance arms, a first resistor connected at one end to the cathode of one of said triodes, a second resistor equal in in value to said first resistor connected at one end to the cathode of the other of said triodes, the other ends of said first and second resistors being connected together, a third and a fourth equal value resistors forming respectively the third and fourth resistance arms of said bridge circuit, a current meter and a first potentiometer connected between the anodes of said triodes and between one end of said third and one end of said fourth equal value resistors, a second potentiometer having its ends connected between the other end of said third resistor and the other end of said fourth resistor, a source of direct voltage, the positive end of said source being connected to the movable tap of said second potentiometer, the negative end of said source being connected to said other ends of said first and second resistors, a multiple position switch for placing any single resistor of said divider serially in circuit between said other ends of said first and second resistors and the grid of said one of said triodes, and a fifth resistor connected between said grid of said other of said triodes and ground.

References Cited in the file of this patent

UNITED STATES PATENTS

| | | |
|---|---|---|
| 1,899,580 | Lynn | Feb. 28, 1933 |
| 1,924,469 | Strecker | Aug. 29, 1933 |
| 2,099,349 | Rosebury | Nov. 16, 1937 |
| 2,338,342 | Lissman | Jan. 4, 1944 |
| 2,611,021 | Perls et al. | Sept. 16, 1952 |
| 2,616,988 | Rodenhuis | Nov. 4, 1952 |

FOREIGN PATENTS

| | | |
|---|---|---|
| 100,598 | Australia | Apr. 8, 1937 |

OTHER REFERENCES

Publication I—Proceedings of the IRE, vol. 24, No. 11, November 1936, page 1533.

"Vacuum Tube Voltmeters," by John F. Rider, published by John F. Rider Publisher, Inc., New York, 1941, pp. 55–60, 109–110, 118–122.